United States Patent [19]

Zisman

[11] Patent Number: 5,156,140
[45] Date of Patent: Oct. 20, 1992

[54] THERMAL INSULATING LINER FOR BUILT-IN BARBECUES

[76] Inventor: Herbert J. Zisman, 9621 S. Dixie Hwy., Miami, Fla. 33156

[21] Appl. No.: 671,337

[22] Filed: Mar. 19, 1991

[51] Int. Cl.⁵ .............................................. F24C 15/10
[52] U.S. Cl. ............................... 126/214 A; 126/41 R
[58] Field of Search ............ 126/214 R, 214 A, 214 B, 126/41 R, 25 R, 214 D, 42, 39 R; 99/443 R, 444, 421 R

[56] References Cited

U.S. PATENT DOCUMENTS

| | | | |
|---|---|---|---|
| 2,168,944 | 6/1937 | Polhemus | 126/29 |
| 2,806,464 | 9/1957 | Williams et al. | 126/214 A |
| 2,898,846 | 8/1959 | Del Francia | 126/214 A |
| 2,972,990 | 2/1961 | Caldwell | 126/214 A |
| 3,322,060 | 5/1967 | Gilbert | 126/214 A |
| 3,515,118 | 6/1970 | Beller | 126/29 |
| 4,077,387 | 3/1978 | Bateman | 126/8 |
| 4,840,128 | 6/1989 | McFarlane et al. | 126/211 |

*Primary Examiner*—James C. Yeung
*Attorney, Agent, or Firm*—Lowe, Price, LeBlanc & Becker

[57] ABSTRACT

A metal barbecue liner includes a thermal insulating liner having walls of twin spaced apart galvanized sheets with one inch of insulation therebetween. An upwardly extending flange surrounds an open portion of the liner so that the liner may be set in an appropriate hole in a counter and retained therein by the flange. Spacers ensure a minimum clearance between walls of the liner and combustible construction in which the liner is mounted. The liner may be constructed of sheet metal such as galvanized steel. Insulation between the sheet metal is one-inch fiberglass foil faced ductboard with the foil facing the inside of the thermal insulating liner next to the barbecue grill.

7 Claims, 5 Drawing Sheets

THERMAL INSULATING LINER FOR BUILT-IN BARBECUES

TECHNICAL FIELD

The present invention relates generally to thermal insulators for barbecues and particularly to such an insulator including a double metal housing enclosing a solid thermal insulator and for mounting a barbecue in a combustible structure in such a manner that heat from the barbecue is transferred by conduction to the structure only through the housing.

BACKGROUND ART

Outdoor cooking has progressed from open wood camp fires to sophisticated gas barbecues. Gas barbecues offer quick heating using natural gas fuel, such as bottled liquified propane, easily adjustable heat controls, and avoid the need for cumbersome and messy wood or charcoal supplies. Modern outdoor barbecues include one or more burners positioned across a bottom of an enclosure with a horizontal grill or griddle positioned across the top of the enclosure. Ceramic bricks are heated by the burners, replacing conventional combustible charcoal briquettes. One or more manually operable controls are provided for regulating gas supply to the burners to adjust cooking temperature of food stuffs to be cooked on the overlying grill or griddle.

Commercially available outdoor barbecues are conventionally mounted in a metal housing heated to high temperatures by the barbecue when it is operating. Because of the high temperatures generated by the burners, the barbecue must be spaced from easily combusted objects, made of, e.g., wood, and therefore cannot be mounted in a wooden housing or support.

Increasingly modern homes include extensive outdoor structures, in the form of a wooden patio or deck, adjoining a residence. Meals are frequently cooked on these structures on stand-alone portable barbecues or grills. Because the metal housings of portable barbecues often reach high temperatures, incidental human contact with the housing is to be avoided. Additionally, the portable barbecue may aesthetically detract from the outdoor environment and be visually incompatible with the surrounding wooden structure, as well as the wooden tables and benches frequently located thereon.

Hence it is desirable to mount the barbecue in a wooden structure on a patio or deck. However, because of the high temperatures produced by the barbecue, it is hazardous and therefore against many building codes to install the barbecue so it contacts a wooden structure of a deck or patio.

Accordingly, an object of the invention is to provide a new and improved article for mounting an outdoor barbecue in a wooden structure without causing combustion of the wooden structure.

Another object of the invention is to provide a thermal insulating liner to prevent contact of a combustible support with high temperature portions of a barbecue.

Still another object of the invention is to provide a thermal insulating liner for a barbecue, wherein the liner provides required clearances from surrounding combustible structures and objects to meet or exceed building code safety requirements for enabling installation of the barbecue into a combustible outdoor structure.

DISCLOSURE OF THE INVENTION

According to one aspect of the invention, an article is provided for supporting a barbecue in a combustible structure for thermally insulating the barbecue from the structure so that the structure is not combusted by heat from the barbecue. The structure includes an opening for receiving the article and the barbecue. The article includes a solid thermal insulator and a double wall metal housing enclosing the thermal insulator. The metal housing includes a central space for receiving the barbecue, the housing being arranged to fit into the opening and contact surfaces of the structure adjacent the opening. The barbecue, housing, space, structure and opening are arranged so that the barbecue contacts and is held by the housing completely spaced from the structure to cause heat to be transferred by conduction from the barbecue to the structure only through the article.

According to another aspect of the invention, an exterior wall of the housing includes outwardly extending ribs arranged to contact surfaces of the structure defining the opening and space the remainder of the exterior wall of the housing from the combustible structure. According to still another aspect of the invention, the housing includes a floor including solid thermal insulating material enclosed by metal top and bottom members, the floor abutting against bottom edges of walls of the housing to form a complete enclosure around flooring and most wall surfaces of the barbecue. The housing and barbecue can be arranged so the barbecue flooring contacts and is supported by the top metal member of the housing floor. The housing and structure are arranged so the bottom metal member of the housing floor contacts and is supported by a horizontal surface of a shelf of the combustible structure.

According to still another aspect of the invention, an object includes a combustible structure including an opening, a barbecue, and an article supporting the barbecue thermally insulating the structure from the barbecue so that the structure is not combusted by heat from the barbecue. The article includes a solid thermal insulator and a double wall metal housing enclosing the thermal insulator. The housing includes a central space receiving the barbecue, the housing fitting into the opening and contacting surfaces of the structure adjacent the opening. The barbecue, housing, space, structure and opening are arranged so that the barbecue contacts and is held by the housing completely spaced from the structure to cause heat to be transferred by conduction from the barbecue to the structure only through the article.

In accordance with a feature of the invention, as a result of the thickness and nature of the double wall construction including the thermal insulation, the maximum average surface temperature of the outer housing is maintained within a range of 152°-189° F. when a barbecue is installed in the liner and adjusted achieve the BTU/hr. rating of the barbecue for one hour.

The above and still further objects, features and advantages of the present invention will become apparent upon consideration of the following detailed description of several specific embodiments thereof, especially when taken in conjunction with the accompanying drawings.

BRIEF DESCRIPTION OF DRAWINGS

FIG. 2 is an exploded view of a metal barbecue liner according to the first embodiment of the invention installed in a front wall and top of a wooden counter;

FIG. 3 is a partial front sectional view through a sidewall, bottom wall and mounting flange of a metal barbecue liner according to the first embodiment of the invention;

BEST MODE FOR CARRYING OUT THE INVENTION

Figure 1:
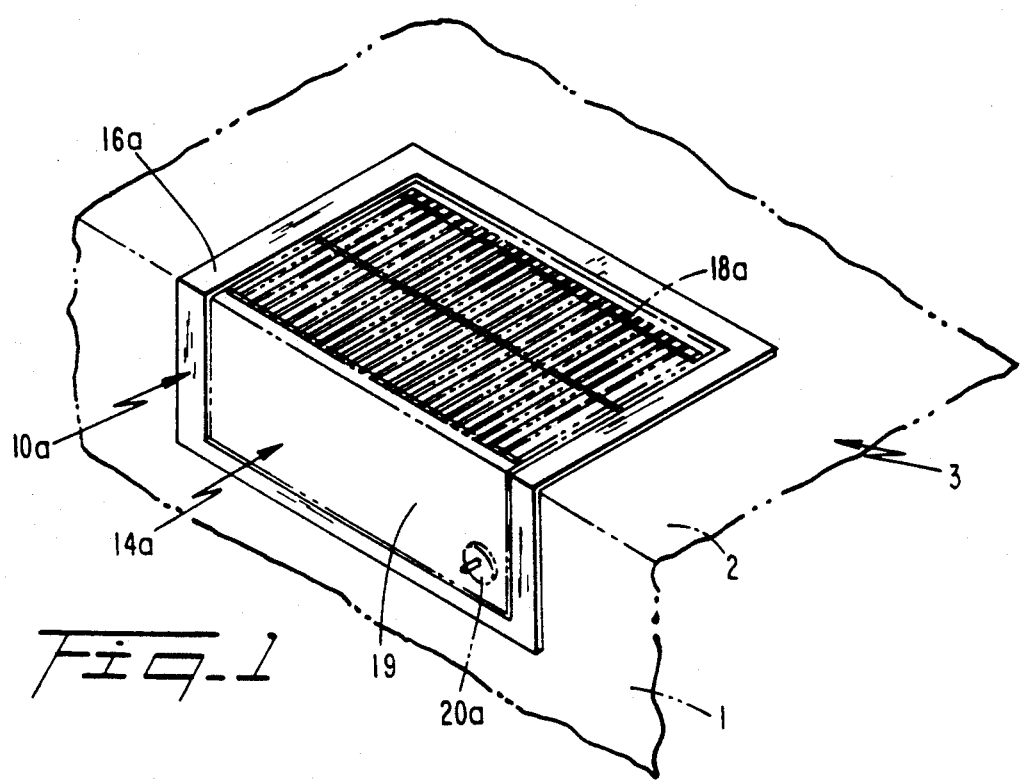
FIG. 1 is a perspective view of a metal barbecue liner according to a first embodiment of the invention installed in a front wall and top of a wooden counter with a gas barbecue mounted in the liner.

Referring to FIG. 1 of the drawings, a first embodiment of thermal insulating liner 10a that carries gas barbecue 14a, is illustrated as secured by conventional fasteners (not shown) in an opening formed as a right parallelepiped in front wall 1 and top face 2 of wooden counter 3. Barbecue 14a is mounted in thermal insulating liner 10 so grill 18a, that defines the top face of the barbecue, is surrounded by metal mounting flange 16a of thermal insulating liner 10a. Front panel 19 of barbecue 14a extends vertically along front wall 1 of counter 3 with burner control knob 20a provided to adjust the gas flame of the barbecue.

Thermal insulating liner 10a is illustrated in detail in FIGS. 2 and 3 of the drawings as a box-like structure having an open top and open front face including parallel sidewalls 22a and 24a between which extend to back wall 26a and floor 28. Each of walls 22a, 24a, 26a and floor 28 includes inner and outer parallel metal panels 34a and 36a, preferably 24 gauge galvanized or stainless sheet steel because of its ability to withstand the temperature and corrosive environment of the barbecue. Sandwiched between panels 34a and 36a is solid thermal insulation 38, preferably one inch thick fiberglass duct board having foil faces.

Insulating material 38 is preferably 1 inch fiberglass foil faced. The foil facing 39 faces to the inside of the thermal insulating liner next to the barbecue grill. Ul-traduct board E1475 is a commercially available insulation meeting these specifications. Inner surface 39 of thermal insulation 38 has a metal foil face to reflect radiant heat transmitted across air space 40 from inner panel 34a. Panels 34a and 36a are joined together using conventional techniques such as acetylene or electric arc welding, pop rivets, Pittsburgh lock seams or other commercially available fastening systems.

Figure 8:
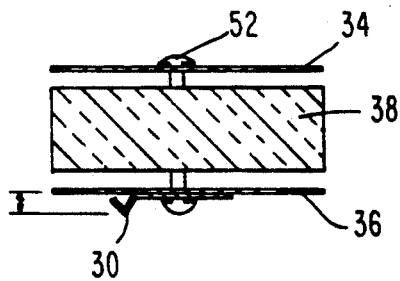
FIG. 8 is a partial top view of a section of a metal barbecue liner in accordance with the embodiment of either FIGS. 1-3 or FIGS. 4-6 including a V spacer mounted on an outer wall.
Figure 9:
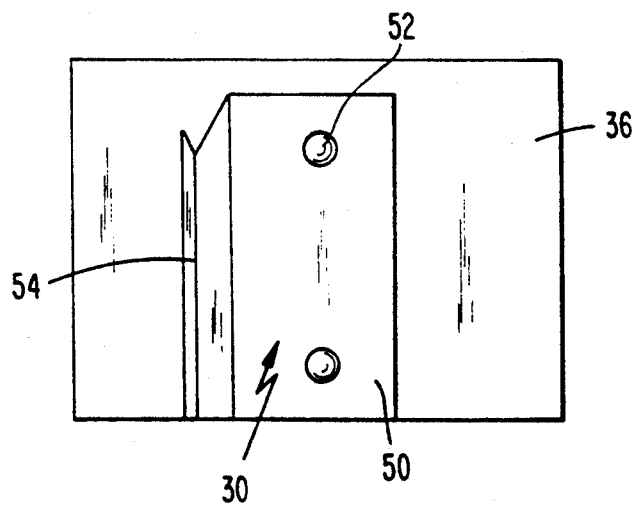
FIG. 9 is a partial perspective view of a section of a metal barbecue liner in accordance with the embodiment of either FIGS. 1-3 or FIGS. 4-6 including a V spacer mounted on an outer wall.

Two spacers 30, in the form of vertical rails or ribs, extend outwardly from the panel 36 of each of walls 22a, 24a and 26a, to maintain a ½ inch clearance space between the respective wall and wooden combustible counter 3. Spacers 30 are preferably vertical V spacers made from 24 gauge sheet metal. Referring to FIGS. 8 and 9, V spacer 30 include a planar mounting flange 50 attached to outer metal panel 36 by pop rivets 52. A protruding portion 54 of V spacer 30 has a partial V cross section so that the spacer functions as a spring clip to resiliently engage inner walls 4 of wooden counter 3. Protruding portion 54 extends outward ½ inch from the surface of metal panel 36. V spacers are preferred to reduce heat transfer to surrounding counter 3 by minimizing thermal contact area with the surrounding wood and minimizing thermal mass of the spacer. Spacer 30 functions as a spring clip to accommodates variations in spacing between liner 10 and counter inner wall 4 and provides additional structural support. V spacer 30 can be alternatively mounted by spot welding or arc welding.

Other forms of spacers can be used including commercially available ½ inch diameter rod or tube stock attached to the liner walls by conventional techniques.

Vertical orientation of elongate spacers provides a ½-inch minimum clearance between major surfaces of respective liner walls 22a, 24a and 26a and adjacent top face 2 and inner walls 4 of wooden counter 3 throughout a vertical extent of the walls while minimizing thermal contact area between liner 10 and counter 3 through the spacers.

Extending from the top edge of each of panels 34a and 36a is an outwardly directed lip having abutting top and bottom faces that are bonded together to form outwardly extending mounting flange 16a. Flange 16a surrounds the open portion of liner 10a and provides surface area for joining peripheral portions of the inner and outer panels 34a and 36a.

Thermal insulating liner 10a is mounted in hole 32a of counter 3; hole 32a includes a cut-out in the front of the counter. The depth of the front cut-out is even with an upper surface of floor 28 of thermal insulating liner 10a. Typical dimensions of the liner to accommodate commercially available barbecues are approximately 12 inches high by 18-24 inches deep by 24-26 inches wide.

Depending on the specific construction of a barbecue with which the liner is to be used, differing arrangements can be used to mount and secure a barbecue in liner 10a. If barbecue 14a in the embodiment illustrated in FIG. 1-3 is not provided with flange 15a, floor 43 of the barbecue rests directly on floor 28 of liner 10a so that the barbecue is supported from beneath. By appropriately controlling the depth of the opening relative to the height of liner 10a, air gap 41 is provided between barbecue wall 42 and liner inner wall 34a to further reduce heat transmission from barbecue 14a to counter 3.

A mounting flange or mounting trim 15a along peripheral top edges of barbecue 14a can be secured to the top and front portions of liner 10a using conventional hardware (not shown). Alternatively, if barbecue 14a is to be suspended from top flange 15a thereof, the barbecue flange is seated on upper flange 16a of liner 10a.

This latter method has the advantage of providing an air gap around barbecue 14a and liner 10a for additional thermal insulation.

The double wall construction of the thermal insulating liner provides required thermal insulation between a gas grill and the combustible material used in making the counter top. In particular, the operation of gas grills must comply with applicable portions of ANSI Z21.58b-1985 for outdoor cooking gas appliances so that operation of the barbecue does not pose a threat to its surroundings under normal operating conditions. Liner 10a provides the required thermal insulation as verified by tests conducted according to Sections 2.12 and 2.13 of the ANSI Standard for wall and floor testing. The liner further reduces temperatures by acting as a thermal mass which absorbs heat generated by the barbecue.

Figure 4:
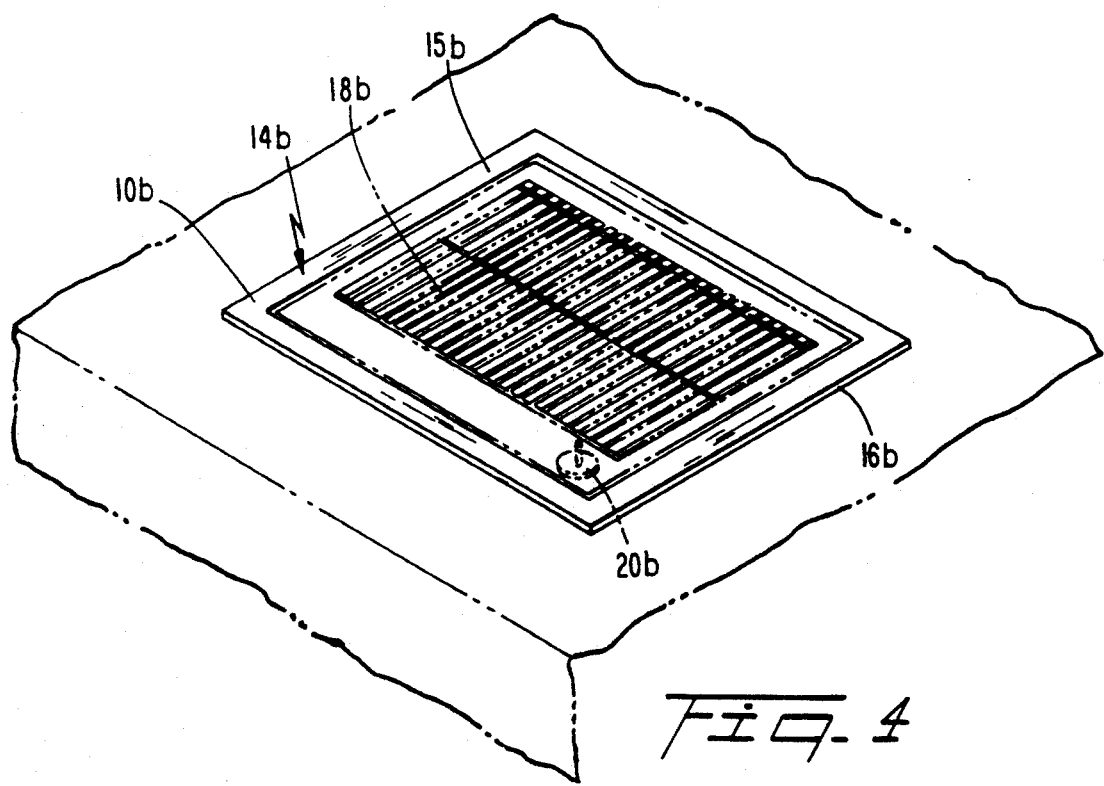
FIG. 4 is a perspective view of a metal barbecue liner according to a second embodiment of the invention installed in a counter top with a gas barbecue mounted in the liner.

A second embodiment of the invention is shown with barbecue 14b installed in FIG. 4. Drop-in thermal insulating liner 10b is installed in an appropriately sized mounting hole in counter 3. Barbecue 14b is installed inside liner 10b and is surrounded by mounting flange 16b of thermal insulating liner 10b. The barbecue can be secured from beneath using appropriate mounting feet or rails (not shown) resting on a suitable platform constructed beneath the barbecue. The platform should meet appropriate standards for the barbecue installed. Alternatively, liner 10b can be provided with a floor similar to floor 29 of the embodiment of FIGS. 1-3.

Foodstuffs to be cooked are placed on grill 18b of barbecue 14b, with burner control knob 20b used to adjust burner flame intensity.

Figure 5:
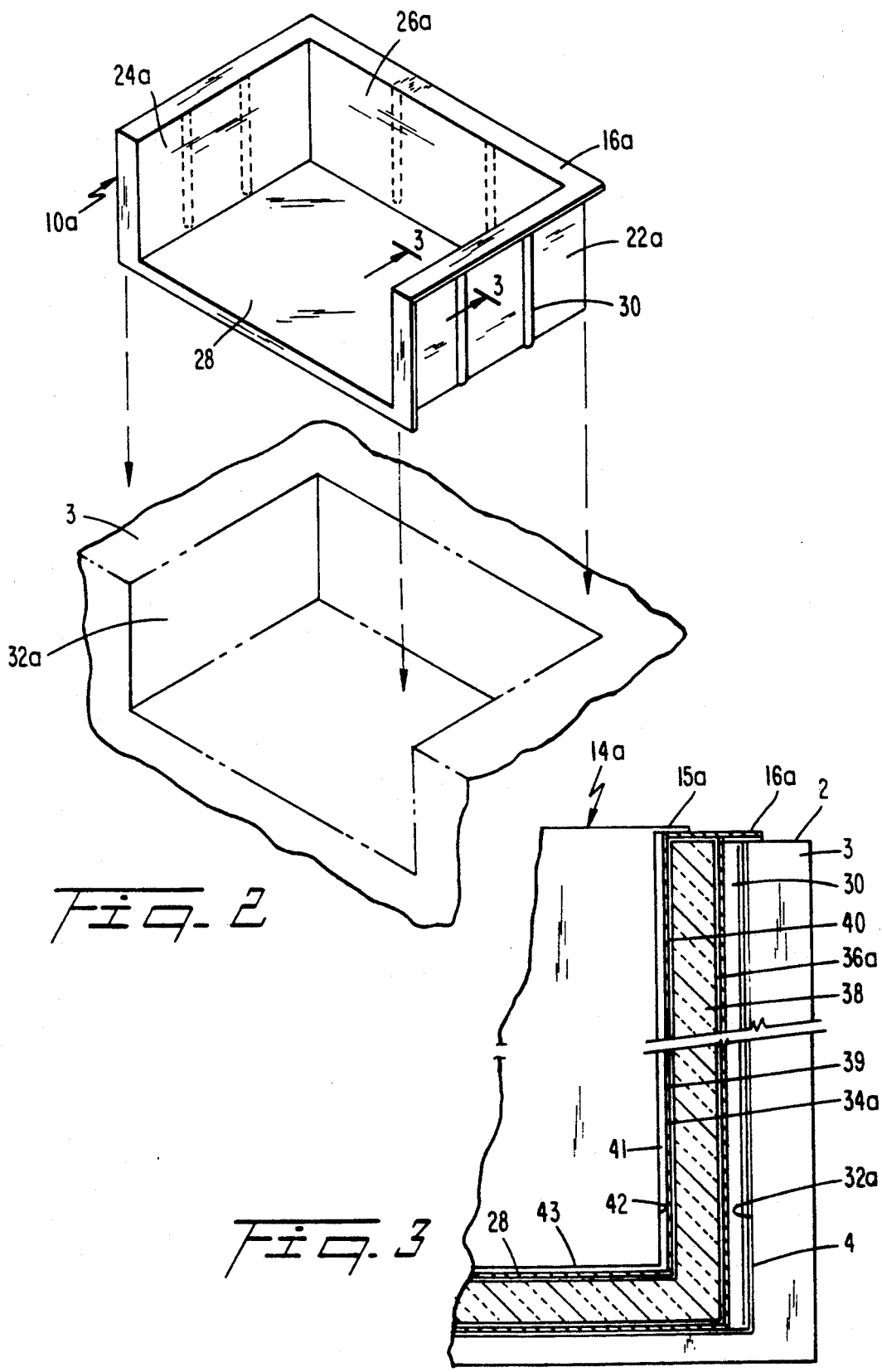
FIG. 5 is an exploded view of a metal barbecue liner according to the second embodiment of the invention installed in a counter top.
Figure 6:
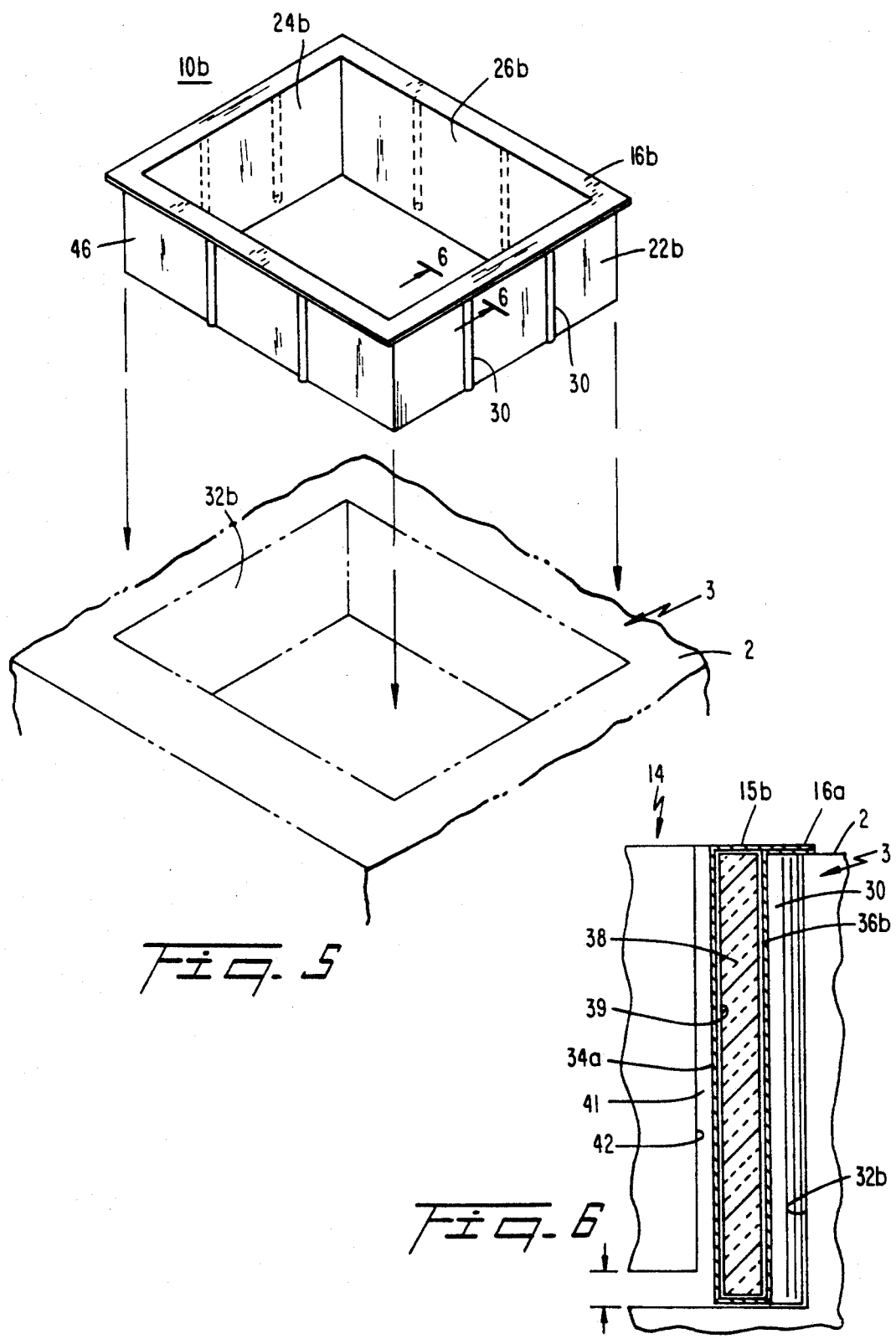
FIG. 6 is a partial front sectional view through a sidewall and mounting flange of a metal barbecue liner according to the second embodiment of the invention.

Liner 10b is depicted in greater detail in FIGS. 5 and 6. Drop-in insulating liner 10b, includes right and left sidewalls 22b, 24b, and rear and front walls 26b, 46. Two spacers 30 are positioned on the exterior surfaces of each of the walls to ensure ½-inch clearance to combustible construction surrounding the liner. No bottom is included so that access to barbecue 14 inserted in liner 10b is available through the bottom of the liner. Mounting flange 16a extends past the vertical rails or rods that form spacers 30 to engage the periphery of counter 12b around mounting hole 32b. Wall construction according to the embodiment shown in FIGS. 4-6 is substantially identical to that of the embodiment of FIGS. 1-3 except that no bottom wall is attached to the bottom edge of the side and back walls.

Barbecue 14b is suspended from upper mounting flange 15b which is seated on and engages flange 16b of liner 10b.

Figure 7:
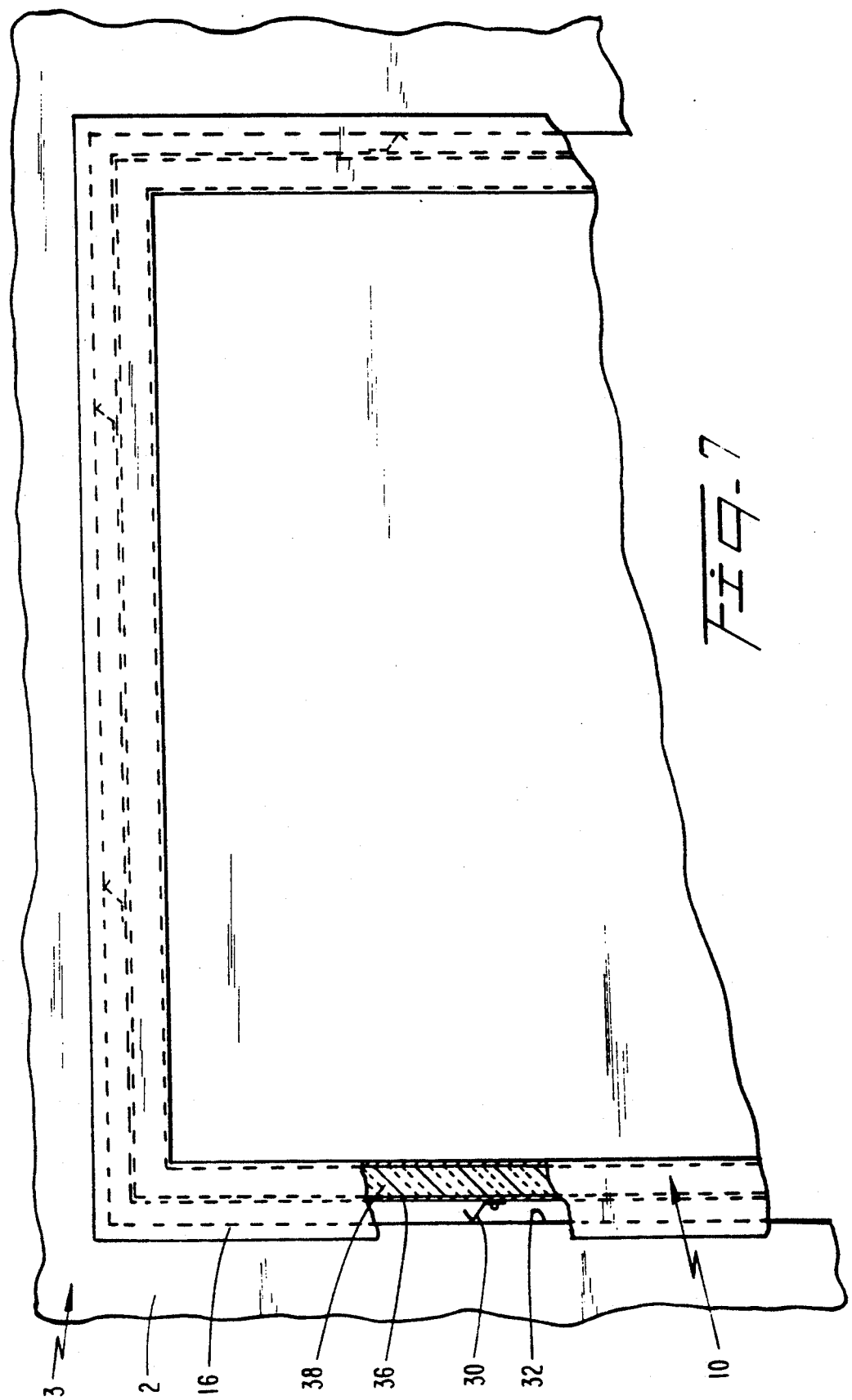
FIG. 7 is a top, partial sectional view of a metal barbecue liner in accordance with the embodiment of either FIGS. 1-3 or FIGS. 4-6 mounted in a counter top.

FIG. 7 is a partial top sectional view of liner 10a or 10b mounted in a wooden counter. Outer panel 36a or 36b is spaced apart from vertical sidewall of counter 3 that defines the opening in the counter for receiving liner 10a or 10b and barbecue 14a or 14b by a distance equal to at least the diameter of spacer 30. Spacer 30 ensures the minimum ½-inch clearance and adds additional stiffness to the liner to improve structural integrity. Mounting flange 16a extends over and past spacer 30 to engage counter top face 2 around the periphery of liner 10a or 10b while allowing the liner to extend into mounting hole 32a.

Although two preferred embodiments of the invention have been described herein, other variations within the scope of the invention are possible. For example, holes for access to the grill may be provided to the walls. The liner may be made of other materials, other than galvanized sheet steel, capable of withstanding the required temperatures. Further, other forms of insulation may be included between the walls of the housings.

While there have been described and illustrated several specific embodiments of the invention, it will be clear that variations in the details of the embodiments specifically illustrated and described may be made without departing from the true spirit and scope of the invention as defined in the appended claims.

What is claimed:

1. An article for supporting a barbecue in a combustible structure for thermally insulating the barbecue from the structure so that the structure is not combusted by heat from the barbecue, the structure including an opening for receiving the article and the barbecue, the article comprising:

a solid thermal insulator; and a double wall metal housing enclosing the thermal insulator including a central space for removably receiving the barbecue, the housing being arranged to fit into the opening and contact surfaces of the structure adjacent the opening, an exterior wall of the housing including outwardly extending ribs extending vertically along the exterior wall and arranged to contact surfaces of the structure defining the opening and space the remainder of said exterior wall of the housing from the combustible structure, said ribs being flexible and self-biased to extend outward from said housing to resiliently engage said surfaces of said structure defining the opening under resilient deformation of said ribs, the barbecue, housing, space, structure and opening being arranged so that the barbecue contacts and is held by the housing completely spaced from the structure to cause heat to be transferred by conduction from the barbecue to the structure only through the article, said barbecue suspended within said central space whereby a bottom and sides of said barbecue do not contact said housing.

2. An article for supporting a barbecue in a combustible structure for thermally insulating the barbecue from the structure so that the structure is not combusted by heat from the barbecue, the structure including an opening for receiving the article and the barbecue, the article comprising:

a solid thermal insulator; and a double wall metal housing enclosing the thermal insulator including a central space for removably receiving the barbecue, the housing being arranged to fit into the opening and contact surfaces of the structure adjacent the opening, an exterior wall of the housing including outwardly extending ribs extending vertically along the exterior wall and arranged to contact surfaces of the structure defining the opening and space the remainder of said exterior wall of the housing from the combustible structure, said ribs including a flexible spring material having a "V" shaped cross section that is self-biased to extend outward from said housing to resiliently engage said surfaces of said structure defining the opening under resilient deformation of said spring material, the barbecue, housing, space, structure and opening being arranged so that the barbecue contacts and is held by the housing completely spaced from the structure to cause heat to be transferred by conduction from the barbecue to the structure only through the article, said barbecue suspended within said central space whereby a bottom and sides of said barbecue do not contact said housing.

3. The article according to claim 2 wherein said flexible spring material comprises a sheet metal.

4. In combination, a combustible structure having an opening, a barbecue, an article supporting the barbecue thermally insulating the structure from the barbecue so that the structure is not combusted by heat from the barbecue, the article including:

a solid thermal insulator; and a double wall metal housing enclosing the thermal insulator including a central space removably receiving the barbecue, the housing fitting into the opening and contacting surfaces of the structure adjacent the opening, an exterior wall of the housing including outwardly extending ribs extending vertically along the exterior wall and arranged to contact surface of the structure defining the opening and space the remainder of the exterior wall of the housing from the combustible structure, said ribs being flexible and self-biased to extend outward from said housing to resiliently engage said surfaces of said structure defining the opening under resilient deformation of said ribs, the barbecue, housing, space, structure and opening being arranged so that the barbecue contacts and is held by the housing completely spaced from the structure to cause heat to be transferred by conduction from the barbecue to the structure only through the article, said barbecue suspended within said central space whereby a bottom and sides of said barbecue do not contact said housing.

5. In combination, a combustible structure having an opening, a barbecue, an article supporting the barbecue thermally insulating the structure from the barbecue so that the structure is not combusted by heat from the barbecue, the article including:

a solid thermal insulator; and a double wall metal housing enclosing the thermal insulator including a central space removably receiving the barbecue, the housing fitting into the opening and contacting surfaces of the structure adjacent the opening, an exterior wall of the housing including outwardly extending ribs extending vertically along the exterior wall and arranged to contact surface of the structure defining the opening and space the remainder of the exterior wall of the housing from the combustible structure, said ribs including a flexible spring material having a "V" shaped cross section that is self-biased to extend outward from said housing to resiliently engage said surfaces of said structure defining the opening under resilient deformation of said spring material, the barbecue, housing, space, structure and opening being arranged so that the barbecue contacts and is held by the housing completely spaced from the structure to cause heat to be transferred by conduction from the barbecue to the structure only through the article, said barbecue suspended within said central space whereby a bottom and sides of said barbecue do not contact said housing.

6. The article according to claim 5 wherein said flexible spring material comprises a sheet metal.

7. An article for supporting a barbecue in a combustible structure for thermally insulating the barbecue from the structure so that the structure is not combusted by heat from the barbecue, the structure including an opening for receiving the article and the barbecue, the article comprising:

a solid thermal insulator;

a double wall metal housing enclosing the thermal insulator including a central space for receiving the barbecue, the housing being arranged to fit into the opening and contact surfaces of the structure adjacent the opening;

outwardly extending vertical ribs attached to an exterior wall of the housing, said ribs formed to have a V shaped cross section with a flexible fixed portion attached to said exterior wall and a free portion biased by resilient deformation of said fixed portion to extend outwardly from said wall to resiliently contact surfaces of the structure defining the opening and space the remainder of said exterior wall of the housing from the combustible structure, the barbecue, housing, space, structure and opening being arranged so that the barbecue contacts and is held by the housing completely spaced from the structure to cause heat to be transferred by conduction from the barbecue to the structure only through the article.

* * * * *